(12) United States Patent
Takeda

(10) Patent No.: US 8,219,263 B2
(45) Date of Patent: Jul. 10, 2012

(54) BICYCLE USER INFORMATION APPARATUS

(75) Inventor: Kazuhiro Takeda, Sakai (JP)

(73) Assignee: Shimano, Inc., Sakai (JP)

(*) Notice: Subject to any disclaimer, the term of this patent is extended or adjusted under 35 U.S.C. 154(b) by 601 days.

(21) Appl. No.: 11/963,728

(22) Filed: Dec. 21, 2007

(65) Prior Publication Data

US 2008/0109121 A1    May 8, 2008

Related U.S. Application Data

(62) Division of application No. 10/605,264, filed on Sep. 18, 2003, now abandoned.

(30) Foreign Application Priority Data

Sep. 20, 2002 (JP) ................................ 2002-274661

(51) Int. Cl.
    *H04W 88/02*      (2009.01)
(52) U.S. Cl. ......... 701/1; 701/408; 701/468; 455/456.1; 455/73; 463/6; 463/36; 463/40; 482/57
(58) Field of Classification Search .................. None
See application file for complete search history.

(56) References Cited

U.S. PATENT DOCUMENTS

| | | | |
|---|---|---|---|
| 3,921,351 A | 11/1975 | Johnson | |
| 5,335,188 A * | 8/1994 | Brisson | 702/163 |
| 5,591,104 A * | 1/1997 | Andrus et al. | 482/7 |
| 5,847,641 A * | 12/1998 | Jinbo | 340/432 |
| 6,002,982 A | 12/1999 | Fry | |
| 6,059,692 A * | 5/2000 | Hickman | 482/8 |
| 6,066,075 A * | 5/2000 | Poulton | 482/8 |
| 6,171,218 B1 * | 1/2001 | Shea | 482/57 |
| 6,204,752 B1 * | 3/2001 | Kishimoto | 340/432 |
| 6,312,363 B1 * | 11/2001 | Watterson et al. | 482/54 |
| 6,344,797 B1 * | 2/2002 | Hosny | 340/573.1 |
| 6,373,430 B1 | 4/2002 | Beason et al. | |
| 6,458,060 B1 * | 10/2002 | Watterson et al. | 482/54 |
| 6,463,385 B1 * | 10/2002 | Fry | 701/468 |
| 6,622,018 B1 * | 9/2003 | Erekson | 455/420 |
| 6,724,299 B2 * | 4/2004 | Takeda et al. | 340/432 |
| 6,812,942 B2 * | 11/2004 | Ribak | 345/30 |
| 6,837,827 B1 * | 1/2005 | Lee et al. | 482/8 |
| 6,850,188 B1 * | 2/2005 | Lee et al. | 342/357.52 |
| 6,868,338 B1 * | 3/2005 | Elliott | 701/469 |
| 6,871,144 B1 * | 3/2005 | Lee | 701/411 |
| 6,921,351 B1 * | 7/2005 | Hickman et al. | 482/8 |
| 6,978,162 B2 * | 12/2005 | Russell et al. | 455/575.2 |
| 7,062,895 B1 * | 6/2006 | Sperie | 54/71 |
| 7,116,008 B2 * | 10/2006 | Kitamura et al. | 307/9.1 |
| 7,162,199 B1 * | 1/2007 | Glickstein et al. | 455/3.02 |
| 7,191,924 B2 * | 3/2007 | Kilmer | 224/420 |

(Continued)

FOREIGN PATENT DOCUMENTS

DE      20115816 U1      4/2002

(Continued)

*Primary Examiner* — Jonathan M Dager
(74) *Attorney, Agent, or Firm* — James A. Deland

(57) ABSTRACT

A bicycle user information apparatus comprises an information receiver that receives information corresponding to the bicycle user through the Internet; and an administration control unit that manages the information received through the information receiver and enables external access to the managed information in response to predetermined criteria. The administration control unit includes a user registration unit that registers identifying information corresponding to the bicycle user.

24 Claims, 7 Drawing Sheets

U.S. PATENT DOCUMENTS

| | | | |
|---|---|---|---|
| 7,200,447 B2* | 4/2007 | Campagnolo et al. | 700/17 |
| 7,397,363 B2* | 7/2008 | Joao | 340/539.11 |
| 7,623,931 B2* | 11/2009 | Campagnolo et al. | 700/17 |
| 8,121,785 B2* | 2/2012 | Swisher et al. | 701/423 |
| 2001/0027375 A1 | 10/2001 | Machida et al. | |
| 2001/0027495 A1 | 10/2001 | Campagnolo | |
| 2001/0049470 A1 | 12/2001 | Mault et al. | |
| 2002/0006825 A1* | 1/2002 | Suzuki | 463/40 |
| 2002/0068587 A1* | 6/2002 | Chapman | 455/461 |
| 2002/0102989 A1* | 8/2002 | Calvert et al. | 455/456 |
| 2002/0113185 A1* | 8/2002 | Ziegler | 248/309.1 |
| 2002/0122410 A1 | 9/2002 | Kulikov et al. | |
| 2002/0164998 A1* | 11/2002 | Younis | 455/456 |
| 2003/0036428 A1* | 2/2003 | Aasland | 463/29 |
| 2003/0125846 A1 | 7/2003 | Yu et al. | |
| 2003/0144047 A1* | 7/2003 | Sprogis | 463/9 |
| 2004/0104842 A1 | 6/2004 | Drury et al. | |
| 2004/0117072 A1* | 6/2004 | Takeda | 701/1 |
| 2004/0128066 A1 | 7/2004 | Kudo et al. | |
| 2004/0192331 A1* | 9/2004 | Gorday et al. | 455/456.1 |
| 2004/0210353 A1 | 10/2004 | Rice | |
| 2005/0153681 A1* | 7/2005 | Hanson | 455/404.2 |
| 2005/0203673 A1* | 9/2005 | El-Hajj et al. | 701/1 |
| 2005/0233861 A1* | 10/2005 | Hickman et al. | 482/8 |
| 2006/0073839 A1* | 4/2006 | Gorday et al. | 455/456.2 |
| 2007/0239627 A1* | 10/2007 | Yui et al. | 705/417 |
| 2009/0270689 A1* | 10/2009 | Galland | 600/300 |

FOREIGN PATENT DOCUMENTS

| | | |
|---|---|---|
| EP | 0523897 A1 | 1/1993 |
| EP | 0887251 A1 | 12/1998 |
| EP | 1059742 A1 | 12/2000 |
| JP | 06-289118 A | 10/1994 |
| JP | 2001-012966 A | 1/2001 |
| JP | 2002-176426 A | 6/2002 |
| WO | 00/11793 A1 | 3/2000 |
| WO | 01/28416 A1 | 4/2001 |
| WO | 01/59712 A1 | 8/2001 |
| WO | 02/05702 A2 | 1/2002 |
| WO | 02/005702 A3 | 1/2002 |

* cited by examiner

BICYCLE USER INFORMATION APPARATUS

CROSS REFERENCE TO RELATED APPLICATIONS

This application is a division of copending application Ser. No. 10/605,264, filed Sep. 18, 2003.

BACKGROUND OF THE INVENTION

The present invention is directed to bicycles and, more particularly, to an apparatus for processing and sharing information relevant to a bicycle user.

Bicycles are not limited just to practical uses. Bicycles often are used in competitive sports as well as in group recreation. Cycle computers commonly are installed on such bicycles, wherein the cycle computer receives signals from various sensors disposed on a bicycle and then calculates and displays information such as bicycling speed, distance traveled and the like. Unfortunately, such information usually is available only to the individual cyclist through his or her own cycle computer. Furthermore, information that may be useful to many cyclists such as information relating to bicycle components, the location of repair shops, characteristics of other riders and the like, is sometimes acquired through magazines and other sources, but not always in a manner that is easily shared among a group.

SUMMARY OF THE INVENTION

The present invention is directed to various features of an apparatus for processing and sharing information relevant to a bicycle user. In one embodiment, a bicycle user information apparatus comprises an information receiver that receives information corresponding to the bicycle user through the Internet; and an administration control unit that manages the information received through the information receiver and enables external access to the managed information in response to predetermined criteria. The administration control unit includes a user registration unit that registers identifying information corresponding to the bicycle user. In another embodiment, a bicycle computer comprises a control unit structured to be mounted to a bicycle; a memory card that stores data including data received through the data receiver, wherein the memory card is detachably coupled to the control unit; and a display unit that displays information corresponding to data received through the data receiver. In another embodiment, a bicycle computer comprises a control unit structured to be mounted to a bicycle; a search signal transmitter that wirelessly transmits a search signal; a search signal receiver that receives a wirelessly transmitted search signal; and a notifying unit that notifies of the receipt of the wirelessly transmitted search signal. In still another embodiment, a bicycle computer comprises a control unit structured to be mounted to a bicycle; a location information detecting unit that detects information corresponding to a current location of the computer; a location information transmitter that transmits information corresponding to the current location of the bicycle; and a location information receiver that receives information corresponding to a current location of another bicycle.

Additional inventive features will become apparent from the description below, and such features alone or in combination with the above features may form the basis of further inventions as recited in the claims and their equivalents.

DETAILED DESCRIPTION OF THE EMBODIMENTS

Figure 1:
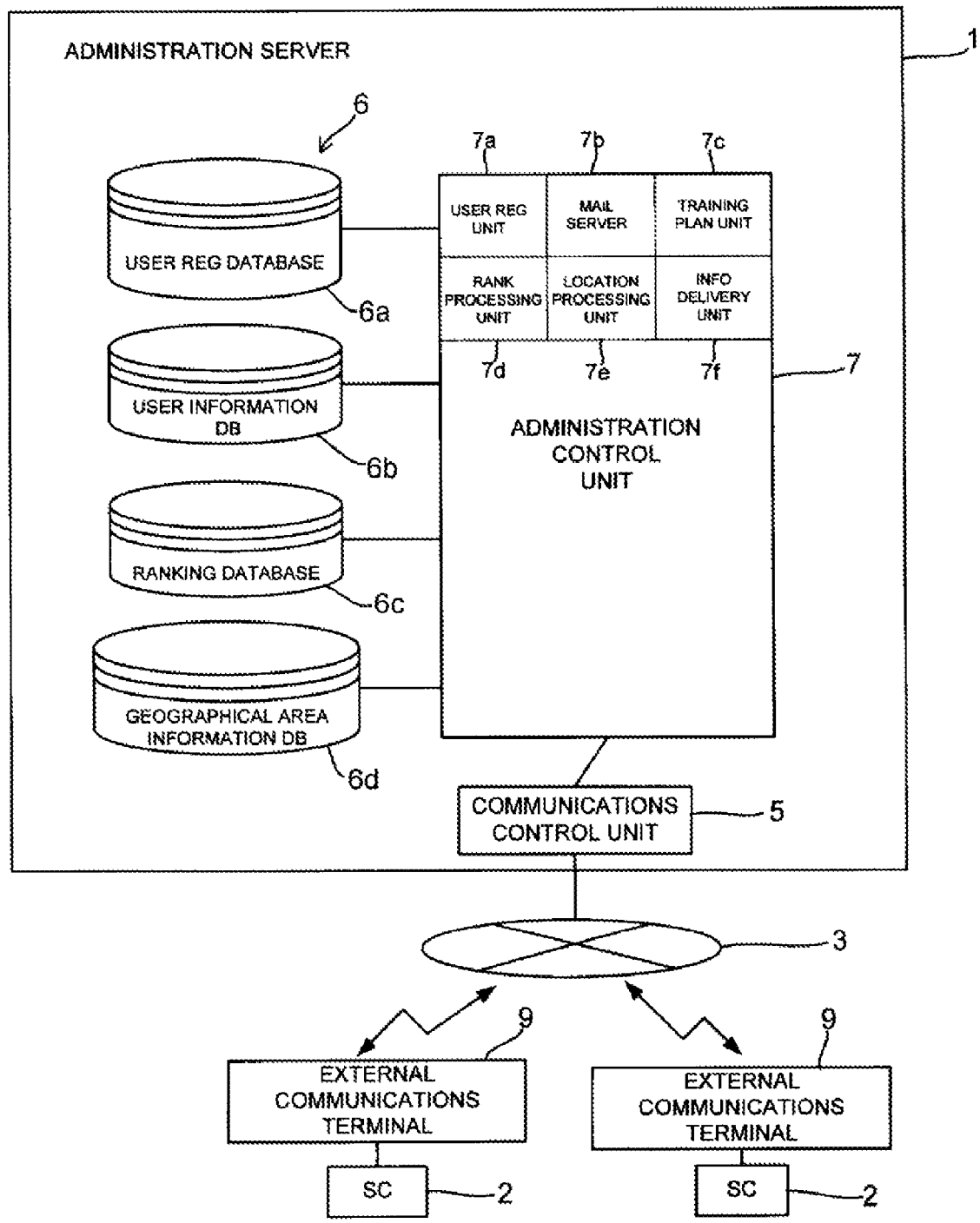
FIG. 1 is a block diagram of a particular embodiment of a bicycle user information apparatus.

FIG. 1 is a block diagram of a particular embodiment of a bicycle user information apparatus. In general, the apparatus comprises an administration control unit in the form of an administration server 1 and a plurality cycle computers 2 interconnected via the Internet, wherein each cycle computer 2 typically is associated with a bicycle user such as a bicycle rider. Bicycle users are registered on the administration server 1, and information relating to cycling history or the like, which may be obtained from cycle computers 2 or from some other means, is administered by administration server 1. Administration server 1 also enables information of various kinds to be delivered to requesters such as registered bicycle users. Such information may be downloaded to one or more of the plurality of cycle computers 2 either conditionally or unconditionally.

Administration server 1 displays web pages over the Internet 3 and communicates with users through such web pages. Administration server 1 comprises a communications control unit 5, various databases 6, and an administration control unit 7 that sends and receives information to and from databases 6, sends and receives information to and from communications control unit 5, and processes data.

Databases 6 include a user registration database 6a, a user information database 6b, a ranking database 6c, and a geographical area information database 6d. Information identifying registered users is stored in user registration database 6a, and personal information such as cycling history data for individual registered users, bicycle components associated with the user, and so on, may be stored in user information database 6b. This means that user information need not be permanently stored in the user's cycle computer, thus making it possible to manufacture the cycle computer inexpensively with smaller capacity. Furthermore, a bicycle or component manufacturer may use the information stored in user information database 6b (if desired by the user) to provide better customer service. Cyclists also may share information among themselves, thus enhancing the group experience.

Ranking information may be stored on a per-item basis for registered users (e.g. cycling distance, cycling time, etc.) in ranking database 6c, and geographical area information (e.g., weather information, transportation timetables, restaurant or bike shop information, etc.), which users may or may not have requested in the past, is stored in geographical area information database 6d. The information stored in geographical area information database 6d may be data that has been downloaded from various web pages and processed.

Administration control unit 7 includes a user registration unit 7a that registers users of the apparatus, a mail server 7b that sends and receives mail through the communications control unit 5 (typically to and from registered users), a training plan unit 7c that develops a training plan for a bicycle user (typically based on rider history data), a rank processing unit 7d that provides ranking information for characteristics of the users, a location processing unit 7e that processes current location information for the users, and an information delivery unit 7f that manages the delivery of information to a requesting user, such as a registered bicycle user. Information delivering unit 7f also can be used to calculate or process desired information. This relieves cycle computer 2 of the burden of calculating or processing such information itself. The units and modules described herein may be implemented through software, firmware, etc.

Training plan unit 7c may process a user's personal information stored in user information database 6b, for example, to develop training plans tailored for individual users. For example, body weight, height, percentage of body fat, etc. may be stored in user information database 6b, and training plan unit 7c may plan course settings and the like using further information sent from the user's cycle computer 2 (e.g., desired hear rate), as described below.

Rank processing unit 7d may use data stored in user information database 6b to create item-by-item ranking data for cycling distance, cycling time, etc. for a plurality of users and store the resultant data in ranking database 6c. This allows users to compare their performance with other users.

Figure 2:
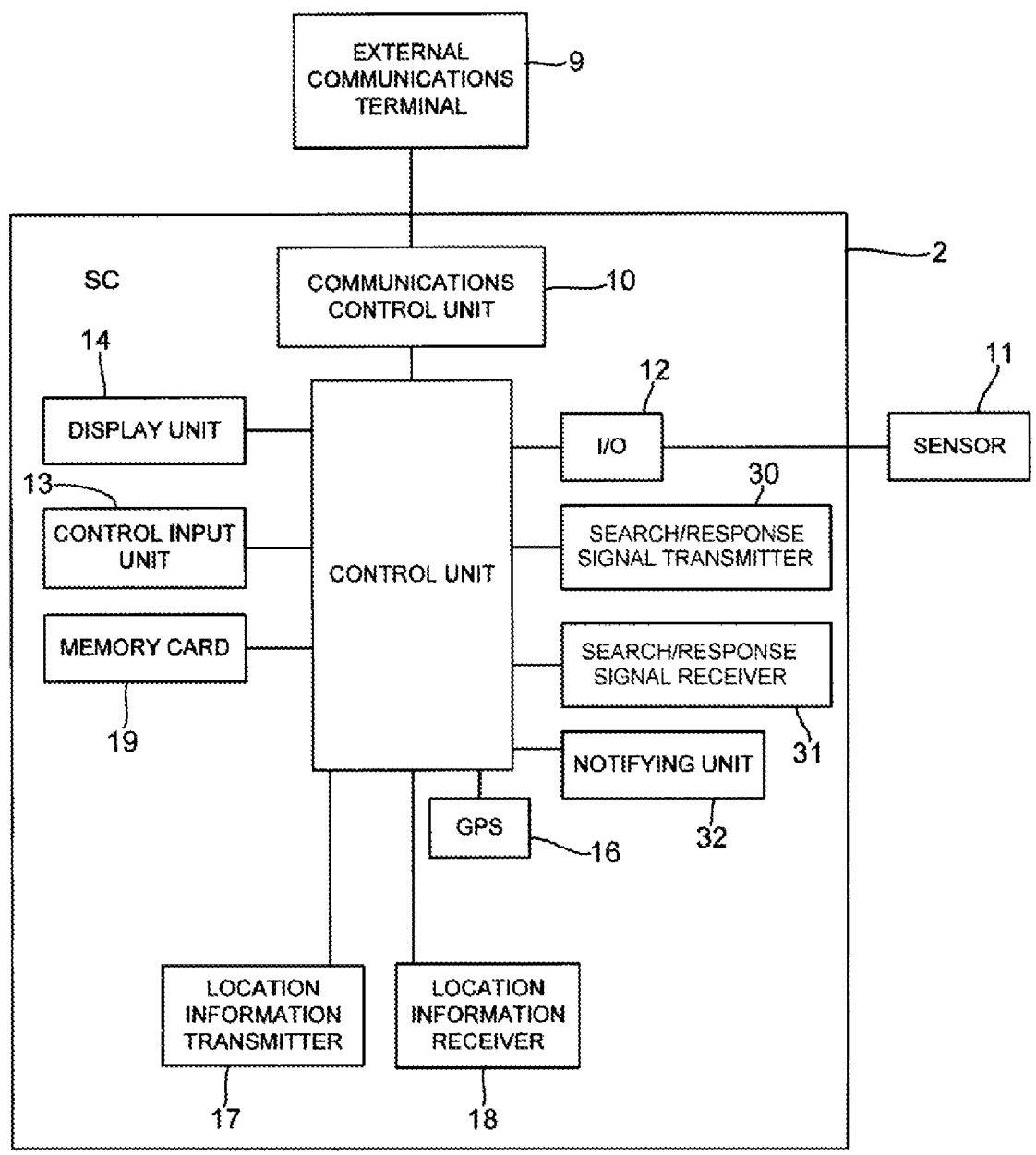
FIG. 2 is a block diagram of a particular embodiment of a bicycle computer.

Each cycle computer 2 can access administration server 1 through the Internet 3 via an external communications terminal 9. Examples of external communications terminal 9 include a mobile phone or a PCI card-type transmitter, such as a wireless transmitter. As shown in FIG. 2, cycle computer 2 comprises a communications control unit 10 that communicates with external communications terminal 9; an I/O interface 12 that receives sensor signals from various sensors 11 installed on a bicycle; a control input unit 13 used to input instruction and control information; a display unit 14 that displays information; and a control unit 15. Control unit 15 processes data obtained from communications control unit 10 and from sensors 11. Control unit 15 then transmits the processed data to communications control portion 10 and/or displays processed data on display unit 14 in response to an instruction from control input unit 13.

Cycle computer 2 also has a location information detecting unit such as a GPS unit 16 for detecting and calculating a current position using signals from a number of satellites, a location information transmitter 17 that transmits information corresponding to the current location of the bicycle, and a location information receiver 18 that receives information corresponding to a current location of another bicycle.

A memory card 19 may be detachably coupled to control unit 15 for storing the information used by control unit 15, including information received from external communications terminal 9. In this embodiment, memory card 19 is adapted to be coupled to a personal computer as well.

A search/response signal transmitter 30 is provided for wirelessly transmitting a search or response signal, a search/response signal receiver 31 is provided for receiving a wirelessly transmitted search or response signal, and a notifying unit 32 is provided for notifying of the receipt of a wirelessly transmitted search signal. These components may be built into external communications terminal 9, communications control unit 10 and/or control unit 15. The functions of these components are described below.

Information input manually by the user into cycle computer 2 and then sent to the administration server 1 may include data identifying the user, body weight, height, percentage of body fat and other personal data. Shop information, photograph data and other information also may be sent to administration server 1. For example, when a user discovers a cycle repair shop, he or she may press a data send button to transmit current location data to the administration server 1, whereupon the current location information is stored in geographical area information database 6d. Information processed by cycle computer 2 may include cycling distance; elapsed cycling time; cycling location; current time; time spent in each gear; maximum, minimum and/or average speed, elevation, acceleration, crank rpm, heart rate, blood pressure, body temperature, barometric pressure, terrain slope, calories burned, etc. The above data also may be stored in a memory card 19.

As noted above, cycle computer 2 may access administration server 1 via the Internet 3. In this embodiment, once the user is registered in administration server 1, various information stored in memory card 19 may be transmitted to the administration server 1, and administration server 1 may store the transmitted information in the plurality of databases 6. Additionally, in this embodiment, a registered user may request desired information from administration server 1. Information delivery unit 7f then may transmit the requested information, and cycle computer 2 may process and/or display the requested information as desired.

Figure 3:
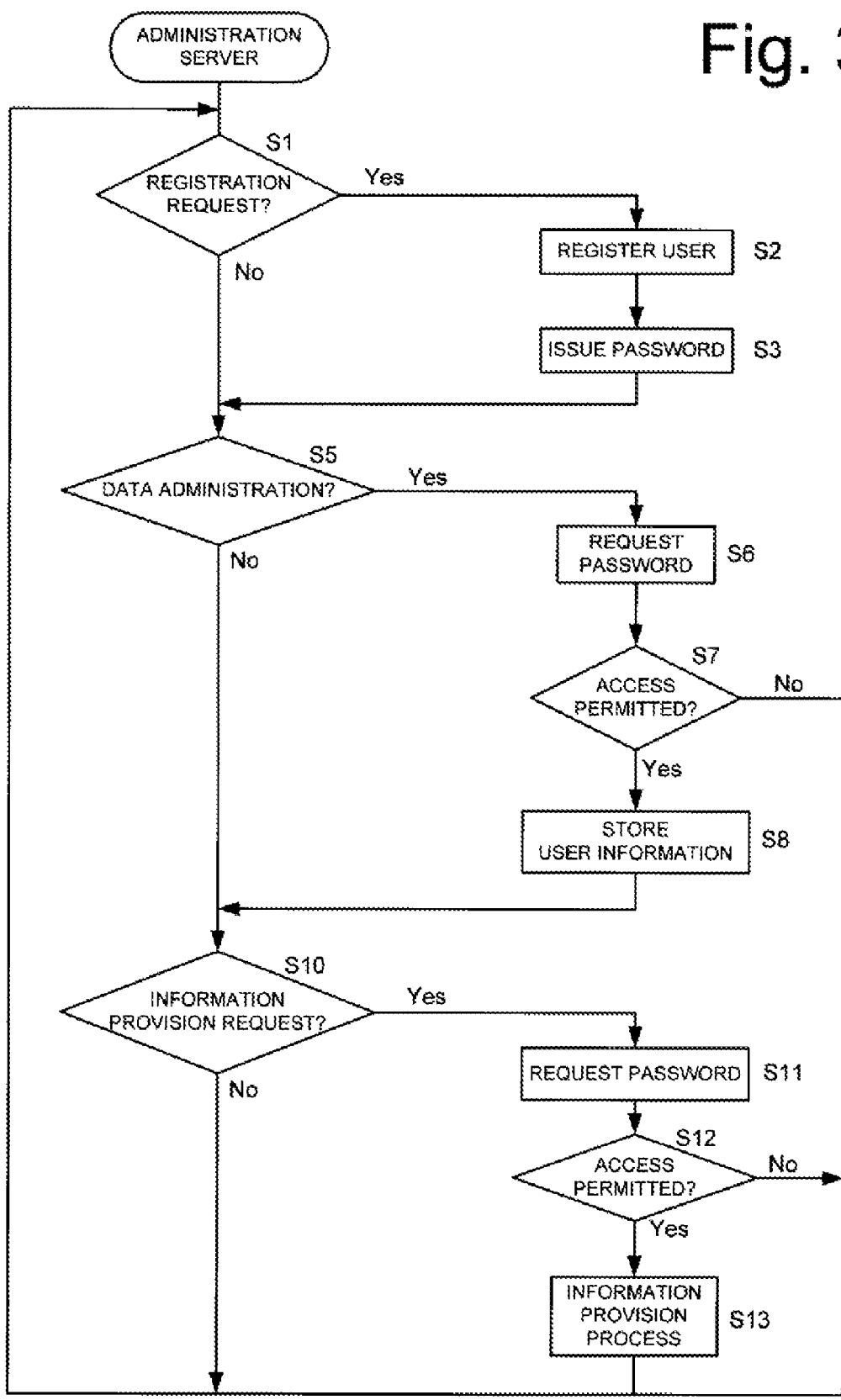
FIG. 3 is a flow chart of a particular embodiment of an algorithm used in the bicycle user information apparatus.

FIG. 3 is a flow chart of a particular embodiment of an algorithm used in the bicycle user information apparatus. More specifically, FIG. 3 illustrates processing routines executed by administration server 1. In general, administration server 1 executes a user registration process, a data administration process, and an information delivery process. While not shown in FIG. 3, typical mail server processes may be executed as well.

Administration server 1 publishes on a web page a description of the system and other pertinent information, and solicits bicycle users wishing to register. If the administration server 1 receives a registration request in a step S1 (e.g., from a bicycle user who transmits such a request using his or her cycle computer 2 and the Internet 3), then the user registration unit 7a performs a user registration routine in a step S2. In the user registration routine, an ID code is assigned to the requesting user, and the requesting user is then registered in the user database 6a. Next, the user is issued a password in a step S3. The password can be used by the registered user to access information stored in the plurality of databases 6 and/or calculated by the various modules in administration server 1.

Information stored on memory card 19 may be transmitted to the administration server 1 and subsequently stored in user information database 6b. More specifically, if the administration server 1 receives a data administration request from a user in a step S5, administration server 1 requests a password in a step S6. It is then determined in a step S7 whether or not the user-entered password is valid. If a user is not registered, access is denied until the user is properly registered. If the user-entered password is valid, then the user data (such as cycling history data) may be communicated from the cycle computer 2 to the administration server 1, wherein administration server 1 processes and/or stores the communicated information in a step S8. The communicated data may be used to create item-by-item ranking data for cycling distance, cycling time, or the like, or to create a training plan.

If the administration server 1 receives an information delivery request from a user in a step S10, administration server 1 requests a password in a step S11. It is then determined in a step S12 whether or not the user-entered password is valid in the same manner noted above. If a user is not registered, access is denied until the user is properly registered. If the user-entered password is valid, then the requested information is provided in a step S13. The types of information that may be provided may include ranking information, identification of users in the same geographic area, information about the geographical area in proximity to the user, training plan information, and other information.

Since users can transmit location information from GPS unit 16 together with cycling history data, administration server 1 is aware of the location of each user. Accordingly, in the event of a request from a user for a "search for users in same geographic area," the location of the requesting user is identified, and the requesting user is provided with information about other users present within a predetermined distance range from his or her location, or present within a certain area such as within the same city or the like. Thus, a user who is cycling alone may, for example, readily search for other cyclists nearby.

Geographical area information database 6d of administration server 1 stores information for geographical areas, such as weather information, transportation schedules, cycle shop information, and the like. Accordingly, in the event of a flat tire during cycling, for example, a user may access the administration server 1 using his or her cycle computer 2, and be provided with information about the closest cycle shop.

As noted above, training plan unit 7c of administration server 1 may create a training plan tailored to the individual user using cycling history data and other information sent by the user. The training plan thus created likewise is stored in the user information database 6b. Accordingly, such a training plan may be provided to the user upon request. Exemplary training plans could include the following:

The user sends to the administration server 1 the distance he or she wishes to cycle each month, and the times at which he or she is available to cycle. Training plan unit 7c develops an appropriate training plan from the cycling history data for the user, and information delivery unit 7f downloads a daily cycling plan that may be displayed on the user's cycle computer 2.

The user sends to the administration server 1 the number of calories he or she wishes to burn. Training plan unit 7c develops an appropriate training plan from the cycling history data for the user, and information delivery unit 7f downloads a proposed cycling plan that may be displayed on the user's cycle computer 2.

The user sends to the administration server 1 the number of hours he or she wishes to cycle on that day. Training plan unit 7c develops an appropriate training plan from the cycling history data for the user, and information delivery unit 7f downloads a proposed cycling plan that may be displayed on the user's cycle computer 2.

The user sends to administration server 1 the desired cycling time and exertion level (e.g., "hard", "average" or "easy") for that day. Training plan unit 7c develops an appropriate training plan from the cycling history data for the user (e.g., on the basis of average speed history), and information delivery unit 7f downloads a proposed cycling plan that may be displayed on the user's cycle computer 2.

The user sends to administration server 1a target average heart rate and cycling time. Training plan unit 7c develops an appropriate training plan from the cycling history data for the user, and information delivery unit 7f downloads a proposed cycling plan that may be displayed on the user's cycle computer 2.

Various other kinds of information relating to a bicycle could be provided as well. For example, while not shown in the drawings, if administration server 1 is provided with a database such as a list of parts available from a manufacturer, parts information could be provided to requesting users.

Figure 4:
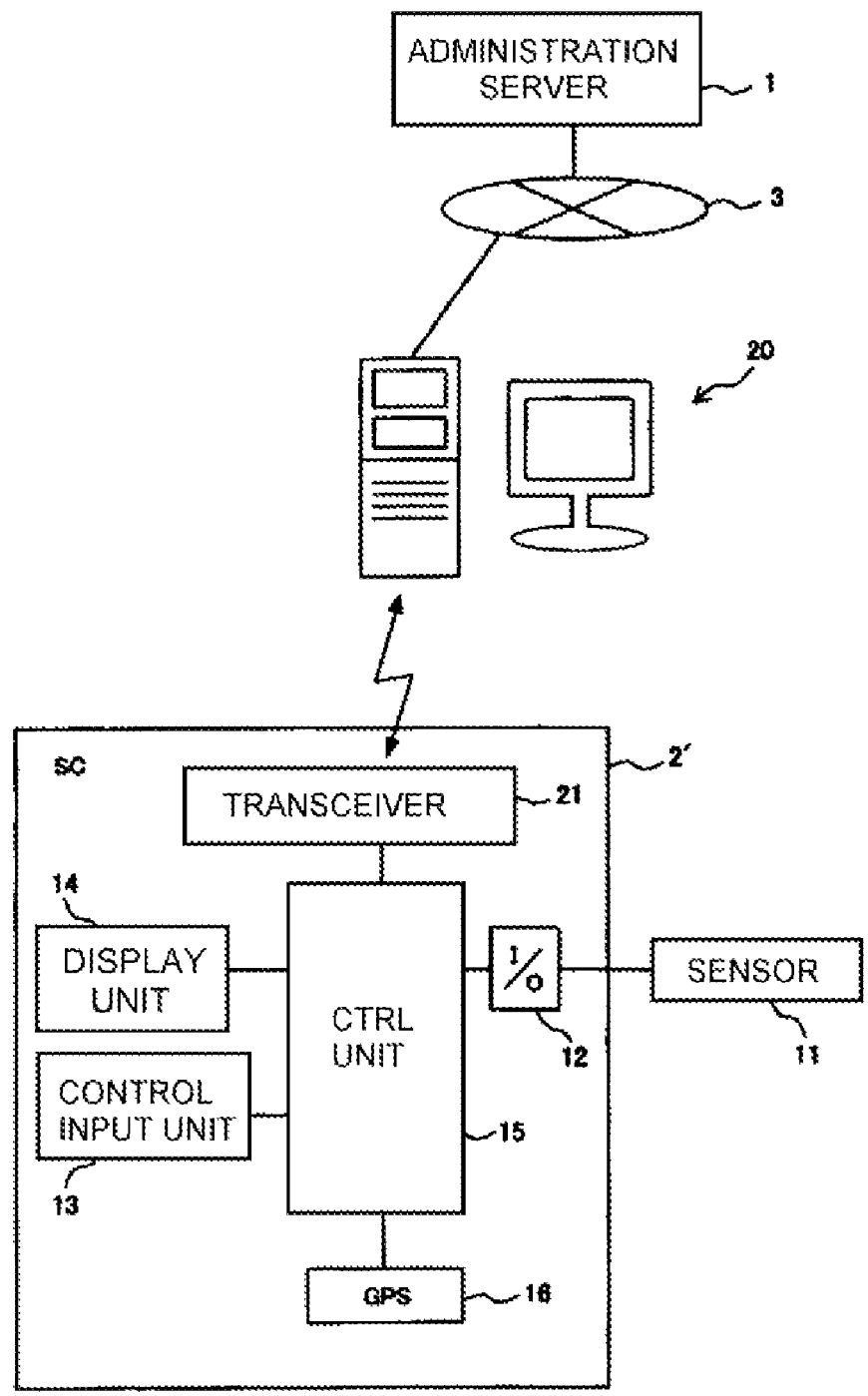
FIG. 4 is a block diagram of another embodiment of a bicycle user information apparatus.

In the embodiment described above, administration server 1 can be accessed directly via the Internet 3 from a cycle computer 2. However, it is also possible to construct an arrangement wherein communication between a cycle computer 2' and the Internet 3 takes place via a user's personal computer 20 as shown in FIG. 4. In this case, there is no need to provide an Internet communication unit on the cycle computer, so the cycle computer can be designed inexpensively.

In this embodiment, cycle computer 2' has as a transceiver 21 (such as an infrared transceiver) for wirelessly transmitting and receiving data. Cycling history data stored in cycle computer 2' initially is stored on personal computer 20 via transceiver 21, and the data then may be transmitted from personal computer 20 to administration server 1 via the Internet 3. Conversely, data from administration server 1 may be sent to personal computer 20 via the Internet 3 and thereafter sent to cycle computer 2' via transceiver 21. In other respects the arrangement is similar to the first embodiment.

Figure 5:
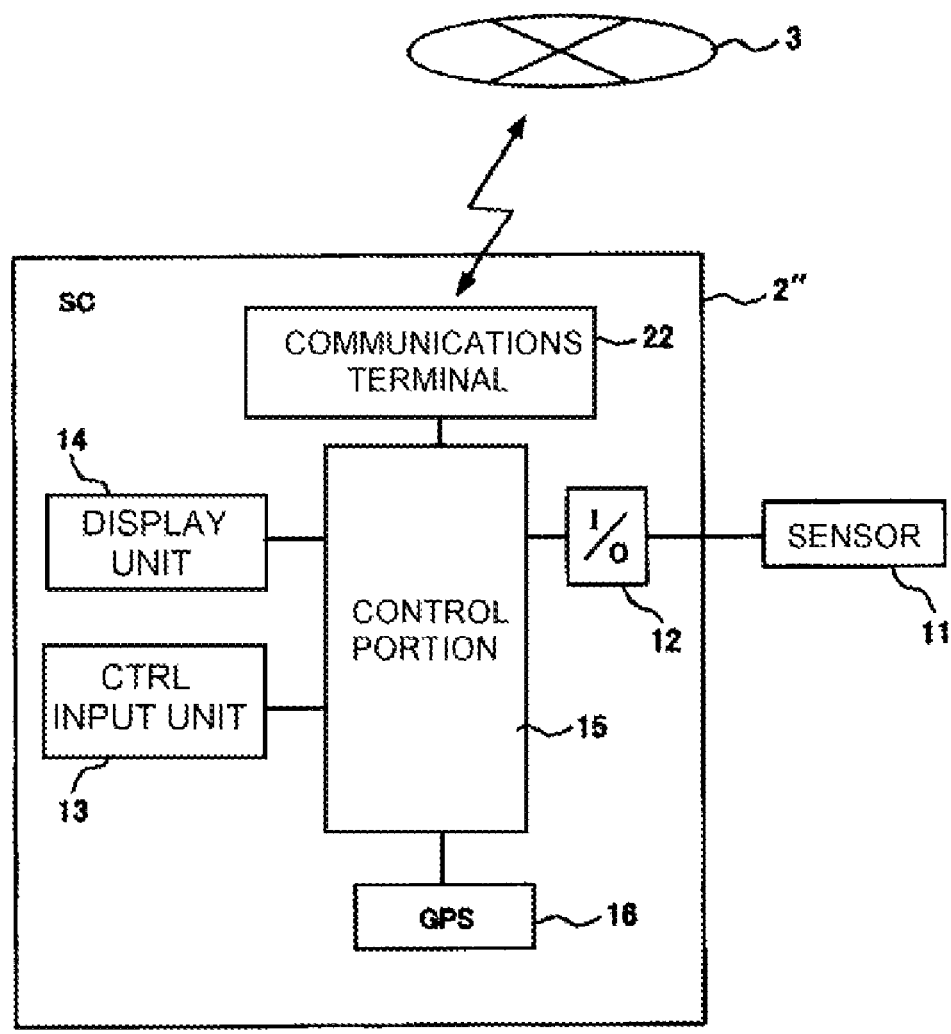
FIG. 5 is a block diagram of another embodiment of a bicycle computer.

In the embodiments described above, an external communications terminal is connected to the cycle computer, but a cycle computer 2" could be constructed with an internal communications terminal 22 as shown in FIG. 5. In other respects the arrangement is similar to the preceding embodiments.

In the embodiments described above, a cycle computer is designed to communicate with other cycle computers via administration server 1, but direct communication among cycle computers also is possible. The cycle computer may be of a type equipped with an external communications terminal as shown in FIG. 2, or with an internal communications terminal as shown in FIG. 4. In either case, a plurality of cycle computers may communicate using the basic algorithm shown in FIG. 6.

Figure 6:
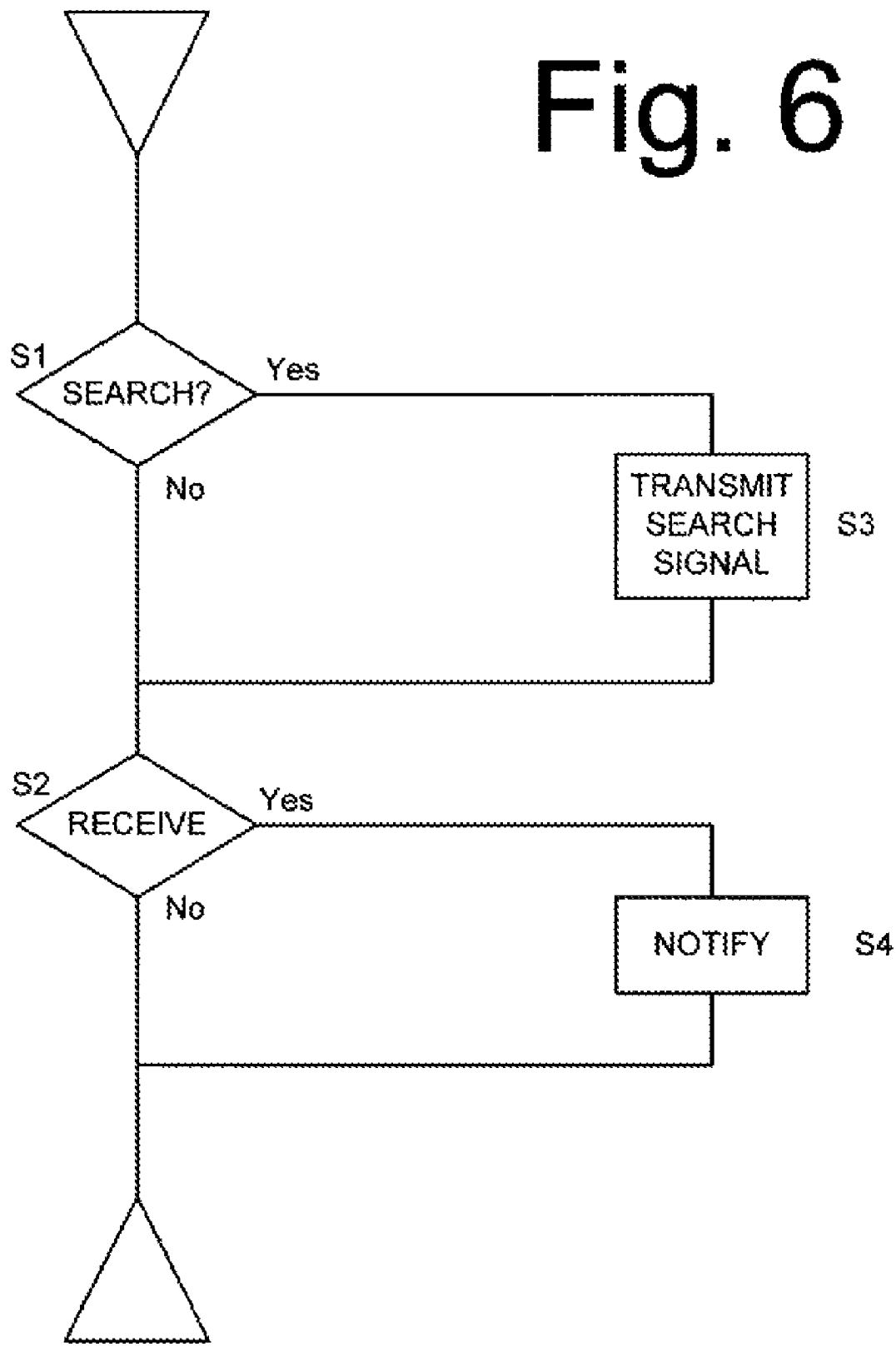
FIG. 6 is a flow chart of a particular embodiment of an algorithm used in a user-to-user bicycle user information apparatus.

As shown in FIG. 6, it is first determined in a step S1 whether the user requested the transmission of a search signal, such as by pressing a search button on the cycle computer. If so, a wireless search signal having a predetermined frequency is transmitted in a step S3 through search/response signal transmitter 30. The predetermined frequency of the search signal may be used to search for other cyclists having similar characteristics within the transmission range of the wireless signal, such as those who own the same type of cycle computer or those who have a particular group characteristic. On the receiving end, it is determined in a step S2 whether a search signal has been received through search/response signal receiver 31. If so, the receiving user is notified in a step S4 through notifying unit 32 that a search signal has been received. Such notification may be accomplished by the emission of a sound or by lighting or flashing a "signal received" LED.

A cyclist receiving a search signal may in turn similarly transmit a response signal through search/response signal transmitter 30, and thereby readily ascertain that another cyclist having the same characteristic is present in proximity to the geographical area where he or she is cycling. In another embodiment, a response signal may be transmitted automatically. If desired, the response signal may have the same frequency as the search signal.

In the direct communication system described above, the cyclist is simply notified of the presence of other cyclists nearby. However, when a cycle computer having a GPS unit is used, the cycle computer may be switched into a search mode when searching for other cyclists. In this mode, a process similar to the one shown in FIG. 7 may be executed. The following description uses an example of a cyclist A who is searching for other cyclists and transmits a search signal, and a nearby cyclist B responds.

Figure 7:
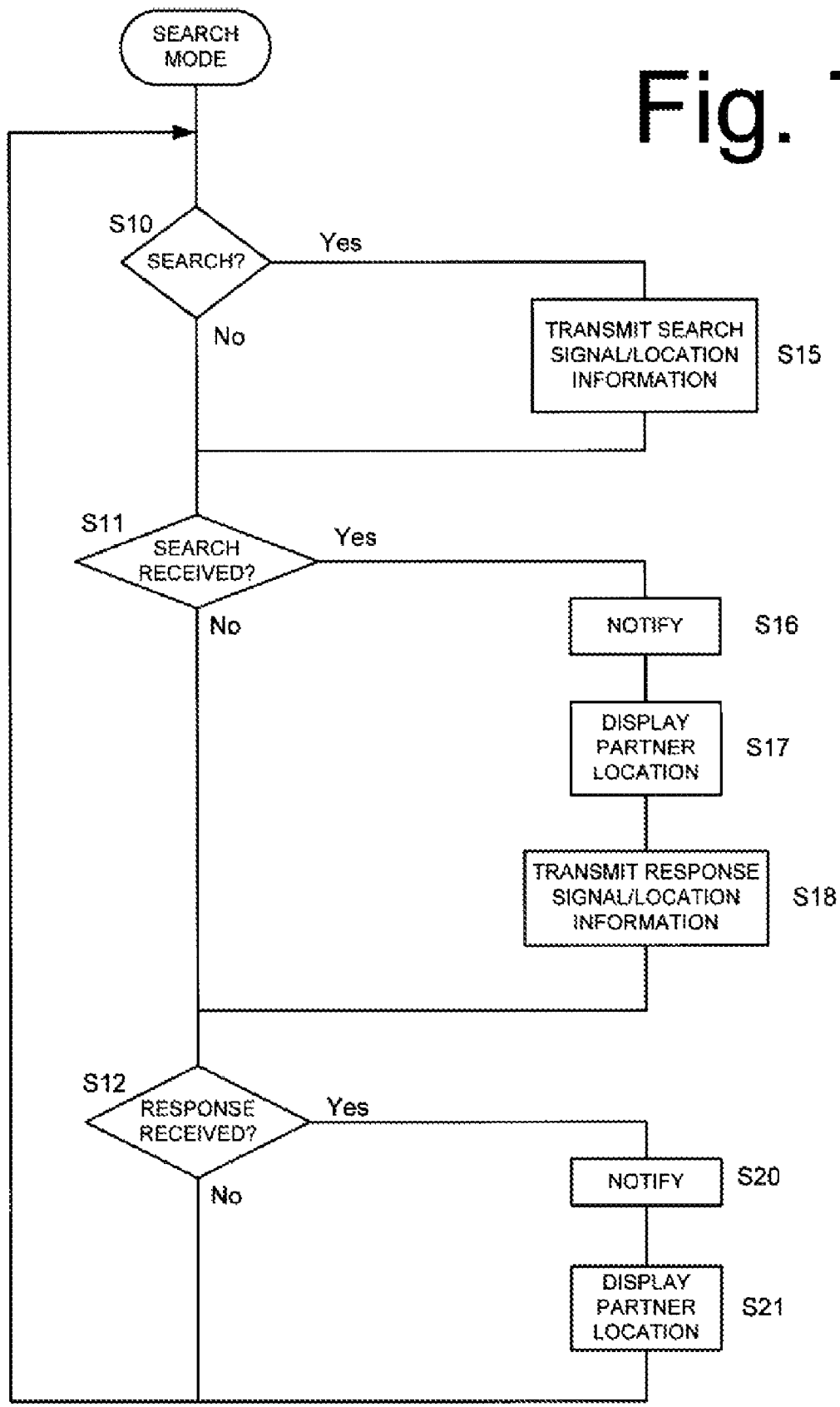
FIG. 7 is a flow chart of another embodiment of an algorithm used in a user-to-user bicycle user information apparatus.

As shown in FIG. 7, it is first determined in a step S10 whether cyclist A requested the transmission of a search signal, such as by pressing a search button. If so, a search signal is transmitted together with current location information for cyclist A (obtained by GPS unit 16) through search/response signal transmitter 30 and location information transmitter 17 in a step S15. It is then determined by cyclist B's cycle computer in a step S11 whether or not the search signal has been received from cyclist A through search/response signal receiver 31. If so, cyclist B is notified of the receipt of the search signal through notifying unit 32 in a step S16. Such a notification may take the form of a sound or a lit/flashing LED. Using the location information from cyclist A received through location information receiver 18, the location of cyclist A may be displayed on the display unit 14 of cyclist B's cycle computer in a step S17. In this embodiment, a map is displayed on the display unit 14 of the cycle computer, and the location of cyclist A is shown on the map.

Then, cyclist B may press a response button, for example, to transmit a response signal together with location information for cyclist B through search/response signal transmitter 30 and location information transmitter 17 in a step S18. It is then determined by cyclist A's cycle computer in a step S12 whether or not a response signal has been received from cyclist B through search/response signal receiver 31. If so, cyclist A is notified of the receipt of the response signal through notifying unit 32 in a step S20. Such a notification may take the form of a sound or a lit/flashing LED. Using the location information from cyclist B received through location information receiver 18, the location of cyclist B may be displayed on the display unit 14 of cyclist A's cycle computer in a step S21. In this embodiment, a map is displayed on the display unit 14 of the cycle computer, and the location of cyclist B is shown on the map. Consequently, it is very easy to search for and locate other cycling companions.

While the above is a description of various embodiments of inventive features, further modifications may be employed without departing from the spirit and scope of the present invention. For example, the size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A bicycle computer comprising:
a control unit structured to be mounted to a bicycle;
a location information detecting unit that detects information corresponding to a current location of the bicycle computer;
a search signal receiver that receives a search signal from another bicycle computer;
a location information transmitter that directly wirelessly transmits information corresponding to the current location of the bicycle computer, upon request of an operator of the bicycle computer in response to receipt of the search signal by the search signal receiver, for locating another bicycle computer within wireless transmission range of the bicycle computer;
a location information receiver that directly wirelessly receives information corresponding to a current location of the other bicycle computer from a location information transmitter of the other bicycle computer; and
a search signal transmitter that transmits a search signal adapted to search for another bicycle computer;
wherein the location information transmitter transmits information corresponding to the current location of the bicycle computer when the search signal transmitter transmits the search signal.

2. The computer according to claim 1 further comprising a display unit that displays information corresponding to the current location of the bicycle computer.

3. The computer according to claim 2 wherein the display unit displays information corresponding to the current location of the other bicycle computer.

4. The computer according to claim 1 wherein the display unit displays at least one of the information corresponding to the current location of the bicycle computer or the information corresponding to the current location of the other bicycle computer on a map.

5. The computer according to claim 1 wherein the search signal is adapted to search for another cyclist having predetermined characteristics within the transmission range of the search signal transmitter.

6. The computer according to claim 5 wherein the predetermined characteristic comprises a same type of bicycle computer.

7. The computer according to claim 1 wherein the search signal transmitter includes a manually operated member for requesting the transmission of the search signal.

8. The computer according to claim 1 further comprising a response signal receiver that receives a response signal that was sent in response to the search signal.

9. The computer according to claim 8 further comprising a notifying unit that provides a notifying signal to the operator when the response signal receiver receives the response signal.

10. The computer according to claim 9 wherein the notifying signal comprises a notifying sound.

11. The computer according to claim 9 wherein the notifying signal comprises a notifying light.

12. The computer according to claim 9 further comprising a display unit that displays information corresponding to the current location of the bicycle computer that transmitted the response signal.

13. The computer according to claim 12 wherein the display unit shows, on a map, the location of the bicycle computer that transmitted the response signal.

14. The computer according to claim 1 further comprising a notifying unit that provides a notifying signal to the operator when the search signal receiver receives the search signal.

15. The computer according to claim 14 wherein the notifying signal comprises a notifying sound.

16. The computer according to claim 14 wherein the notifying signal comprises a notifying light.

17. The computer according to claim 14 further comprising a display unit that displays information corresponding to the current location of the bicycle computer that transmitted the search signal.

18. The computer according to claim 17 wherein the display unit shows, on a map, the location of the bicycle computer that transmitted the search signal.

19. The computer according to claim 1 further comprising a response signal transmitter that transmits a response signal to acknowledge the receipt of the search signal.

20. The computer according to claim 19 wherein the response signal transmitter includes a manually operated member for requesting the transmission of the response signal.

21. The computer according to claim 19 wherein the response signal is transmitted automatically in response to receipt of the search signal.

22. The computer according to claim 19 wherein the response signal has the same frequency as the search signal.

23. The computer according to claim 19 wherein the location information transmitter transmits information corresponding to the current location of the bicycle computer when the response signal transmitter transmits the response signal.

24. The computer according to claim 1 wherein the location information transmitter transmits information corresponding to the current location of the bicycle computer only upon request of the operator.

* * * * *